Figure 1:
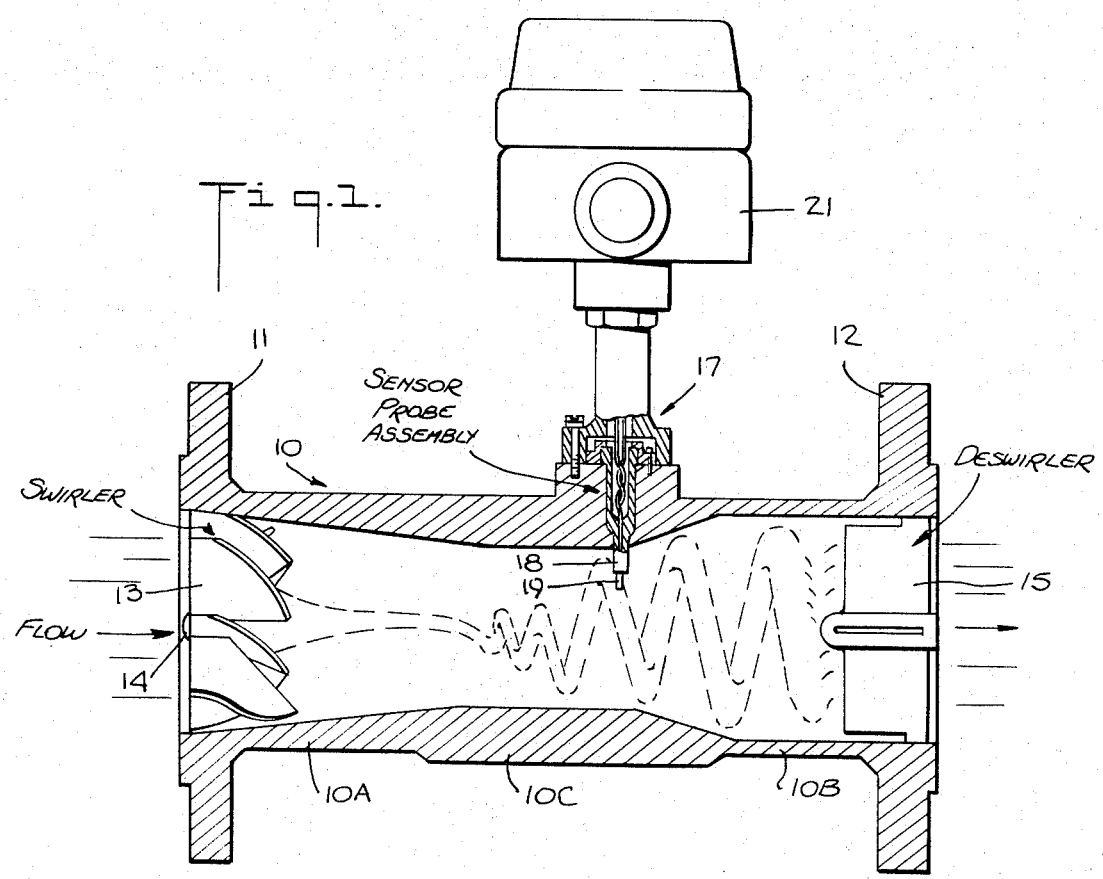

United States Patent
Herzl

[11] 3,776,033
[45] Dec. 4, 1973

[54] VORTEX-TYPE MASS FLOWMETERS
[75] Inventor: Peter J. Herzl, Morrisville, Pa.
[73] Assignee: Fischer & Porter Company, Warminster, Pa.
[22] Filed: Mar. 6, 1972
[21] Appl. No.: 232,058

[52] U.S. Cl. ............................................. 73/194 B
[51] Int. Cl. ................................................ G01f 1/00
[58] Field of Search ................................. 73/194 B

[56] References Cited
UNITED STATES PATENTS
3,370,463  2/1968  Thanaud ............................. 73/194
3,452,603  7/1969  Kaiser et al. ........................ 73/466

Primary Examiner—Herbert Goldstein
Attorney—Michael Ebert

[57] ABSTRACT

A vortex-type mass flowmeter for measuring the mass of fluid passing through a flow tube as well as the density thereof. A bluff body, swirl blades or other means disposed within the tube acts to create a pulsatory fluidic vortex therein whose frequency varies as a function of the volumetric flow rate of the fluid being measured. Placed within the flow tube is a pressure-responsive transducer adapted to generate an electrical signal whose frequency is proportional to the fluidic pulse rate and whose amplitude is a function of the kinetic energy contained in the vortex. The transducer signal is processed by an operational amplifier, the gain of which is inversely proportional to frequency, thereby effectively dividing the transducer signal by frequency throughout the operating range of the meter to yield an output signal whose amplitude is indicative of mass flow. By additionally dividing this output signal by frequency with a second amplifier having a gain which is inversely proportional to frequency, a signal indicative of the fluid density is produced.

6 Claims, 2 Drawing Figures

3,776,033

VORTEX-TYPE MASS FLOWMETERS

BACKGROUND OF THE INVENTION

This invention relates generally to mass flow measurement, and in particular to a simple mass flowmeter of the vortex type having no moving parts.

In many industrial processes, gas supply systems, and in various chemical applications, one must not only measure the volumetric flow of fluids being treated or supplied, but also the mass flow thereof. Thus in certain chemical applications, the quantities of reactants are best specified according to mass, and in metering combustible gas supplied to consumers, one must know the total mass of the gas supplied. When standard volumetric flowmeters are employed for this purpose, it is necessary to convert the volume measurement to a reading of mass flow.

This conversion is readily effected by multiplying the volume measurement by the density of the fluid being measured. Hence the volumetric flowmeter must include indicating means that is calibrated to account for the density factor. Since the density of a given fluid is a function of its temperature and pressure, should the meter be calibrated on the assumption that temperature and pressure is fixed at some value, the mass reading would be inaccurate by reason of inevitable fluctuations in temperature and pressure. Hence it has heretofore been necessary, in order to produce highly accurate mass flow readings, to determine the actual density of the fluid, rather than to assume an unchanging density value.

For example, in a mass flowmeter of the turbine type, a volumetric flowmeter operates in conjunction with a float densitometer to afford a mass flow reading. A permanent magnet attached to the turbine rotor, generates an alternating current in a fixed coil associated therewith, the frequency of the current being proportional to volumetric flow rate. A separate float acts to position an angular transducer which yields a D-C output proportional to fluid density. The signals from the densitometer and the turbine frequency converter are both fed to a computer, the output of which is the product of density and velocity or mass flow rate. A mass flowmeter of this type, because it employs a rotary turbine, has all of the many disadvantages of meters employing moving parts.

The acoustic velocity flowmeter avoids the use of moving parts to carry out mass flow measurement. This meter employs two sets of crystals, each set forming a transmitter and receiver. One set is angled upstream and the other downstream in a flow tube to transmit and receive acoustic wave trains. A crystal transducer placed in contact with the fluid, determines its density. A computer serves to multiply the beat frequency derived from the two sets of crystals with a density signal derived from the density-sensing crystal transducer to produce an output proportional to flow mass. The main drawback of an acoustic velocity flowmeter is that it entails relatively complex and costly electronic equipment.

Another approach to the measurement of mass flow without using moving parts is that disclosed in the Chanaud U.S. Pat. No. 3,370,463, which incorporates a "Swirlmeter" as a volumetric flow measuring device, the Swirlmeter causing the fluid being measured to precess at a repetition rate or frequency proportional to flow rate.

This precession is manifested by measurable pressure and temperature fluctuations in the fluid, caused by the alternate conversion between hydrostatic energy and kinetic energy in the swirling fluid. The amplitude of the fluctuations is therefore proportional to the kinetic energy which is proportional to the product of the density of the fluid and the square of its flow velocity, while the frequency of these fluctuations is proportional to flow velocity. It is to be noted that the ratio of kinetic energy and flow velocity is proportional to the density of the fluid times the volume flow rate, and hence the mass flow rate.

By placing a sensor in the Swirlmeter adapted to detect the kinetic energy, and by converting the frequency and amplitude of these fluctuations into signals which are fed to a suitable operational arithmetic device, an output signal is generated that is proportional to the mass flow rate.

The Swirlmeter approach to mass flow measurement as disclosed in the Chanaud patent, has distinct advantages over meters of the type heretofore known, but it has the serious drawback of being excessively complex and costly from the electronic standpoint.

SUMMARY OF THE INVENTION

In view of the foregoing, the main object of the present invention is to provide a vortex-type flowmeter for measuring the mass density of a fluid without the use of moving parts and by means of inexpensive electronic circuits of simple design.

By "vortex-flowmeter" as used herein is meant any meter having a flow tube through which the fluid to be measured is conveyed, and incorporating stationary means to so modify fluid flow as to create a pulsatory vortex in the flow tube whose frequency is a function of flow velocity.

More specifically, it is an object of this invention to provide a vortex-type flowmeter in which the kinetic energy contained in the pulsatory vortex is sensed by a pressure-responsive transducer whose signal is processed to derive an indication of the mass of the fluid passing through the meter.

Also an object of the invention is to provide a vortex-type mass flowmeter which is efficient and reliable in operation and which affords highly accurate indications of fluid mass flow and density.

Still another object of the invention is to provide a compact mass flowmeter which may be readily installed in a fluid line.

Briefly stated, these objects are attained in a meter having a flow tube which may be interposed in a fluid line, an obstacle or other means being disposed in the flow path to create a pulsatory fluidic vortex whose frequency varies in accordance with the volumetric flow rate of the fluid being measured.

Mounted within the flow tube is a pressure-responsive transducer preferably constituted by a piezo-electric element, adapted to generate an electrical signal whose frequency is proportional to the fluid velocity and whose amplitude is a function of the kinetic energy contained in the vortex. The transducer signal is processed by an operational amplifier whose gain is inversely proportional to frequency, thereby dividing the transducer signal by frequency throughout the operating range of the meter to yield an output signal whose amplitude is indicative of mass flow. When subsequently divided by frequency by a second operational amplifier whose gain is inversely proportional to frequency, this output signal is indicative of fluid density. Total mass flow may be determined by integrating the output signal.

OUTLINE OF THE DRAWINGS

Figure 2:
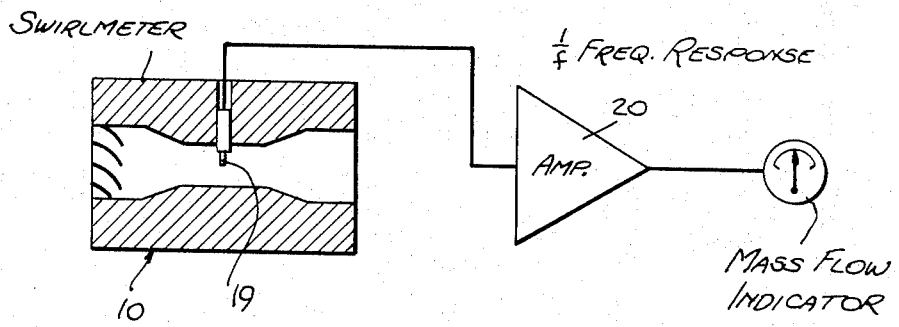

For a better understanding of the invention as well as other objects and further features thereof, reference is made to the following detailed description to be read in conjunction with the accompanying drawings, wherein:

FIG. 1 is a longitudinal section taken through a swirl-type meter for mass flow measurement incorporating a pressure sensor probe assembly in accordance with the invention; and FIG. 2 schematically shows the circuit diagram of the meter.

DESCRIPTION OF THE INVENTION

A mass flowmeter in accordance with the invention, makes use of any know form of volumetric flowmeter of the vortex type, in conjunction with a pressure responsive sensor whose output is applied to an operational amplifier having a gain inversely related to the frequency of the applied signal, thereby producing an output signal proportional to the mass flow rate of the fluid being measured.

A vortex-type flowmeter is adapted to measure the flow rate of a fluid passing through a conduit by producing fluidic pulses or oscillations whose repetition rate or frequency varies in accordance with flow rate. Two species of vortex-type meters are commercially available in the United States, one being the so-called Swirlmeter type, and another, the bluff-body type. The present invention is not limited to these specific types and is applicable to all forms of hydrodynamic oscillatory metering devices in which fluidic variations are sensed to provide an indication.

In Swirlmeters, such as those described in U.S. Pat. Nos. 3,370,463, 3,279,251, 3,314,289 and Re. 26,410, among others, a homogenous fluid whose flow rate is to be measured, is forced to assume a swirl component. This is accomplished by feeding the fluid into the inlet section of a flow tube having a fixed set of swirl blades therein which imparts a swirling motion to the fluid passing therethrough. Downstream of the swirl blades in the tube, is a Venturi section which first constricts and then expands the flow passage to transform the swirling motion into precessional movement in the expanding region of the Venturi section to create a vortex.

In the obstacle or bluff-body type of vortex meter, such as that described in U.S. Pat. Nos. 3,116,639 and 3,587,312, the body is mounted within the flow conduit transversely with respect to the flow axis thereof to create fluidic oscillations whose frequency is proportional to flow rate. The present invention encompasses all existing types of vortex meters, but for purposes of disclosure, the invention will be described in connection with a Swirlmeter.

Referring now to FIGS. 1 and 2, a Swirlmeter which includes a pressure sensor probe assembly and a signal processing circuit in accordance with the invention, comprises a meter body constituted by a flow conduit or tube 10 having mounting flanges 11 and 12 at either end thereof to facilitate the interposition of the meter in a line whose fluid is to be metered. The fluid may be any homogeneous fluid or gas.

Flow tube 10 is constituted by a cylindrical inlet section 10A, a cylindrical outlet section 10B, and a Venturi section 10C interconnecting the inlet and outlet sections. Venturi section 10C is formed with a throat entrance region of decreasing cross-sectional area extending downstream from inlet section 10A to a constricted or throat region which leads to a flaring or throat exit region of increasing cross-sectional area communicating with outlet section 10B. Thus the Venturi serves to constrict the flow coming from the inlet section and to expand flow in advance of the outlet section.

Mounted within inlet section 10A is a fixed array of curved swirl blades 13 radiating from a hub 14. To provide a strong signal and a high information rate, the curvature of the swirl blades is made such as to significantly deflect the incoming flow of fluid with respect to the longitudinal axis of flow tube 10.

Thus fluid entering inlet section 10A is forced by the array of swirl blades to assume a swirling motion, the swirling fluid being directed into Venturi section 10C. In the flaring exit region of the Venturi where the increasing area gives rise to fluid expansion, the swirling flow is converted into precessional motion about the longitudinal axis of the tube. The frequency of precession depends on the volumetric flow rate. To straighten out the flow leaving the meter, a set of planar deswirl blades 15 extending radially from a hub 16, is fixedly disposed in the outlet section 10B.

Cyclic variations in local fluid velocity, as a result of the precessional motion, are detected by a sensor assembly generally indicated by numeral 17 and constituted by a probe 18 which extends into Venturi section 10C at right angles to the longitudinal axis thereof and terminates in a pressure-responsive piezo-electric crystal transducer 19, whose output voltage is varied periodically in response to fluidic pressure changes produced by the precessing fluid. In practice, the transducer may be mounted on a plug receivable in a socket mounted on the probe, to facilitate replacement thereof, when necessary.

In operation, pressure changes sensed by transducer 19 are converted into corresponding changes in amplitude in the signal generated by the transducer, the amplitude being a function of the kinetic energy contained in the fluid vortex in accordance with the following equation:

$$A = WV^2/2g = K_1 WV^2 = K_2 \times \text{density} \times f^2$$

where
 $A$ is the amplitude of the transducer signal
 $W$ is the fluid mass
 $V$ is the fluid velocity
 $g$ is gravity
 $f$ is the signal frequency
 $K_{1, 2}$ are constants If therefore we divide signal amplitude ($A$) by frequency ($f$), we obtain $K \times \text{density} \times f$, which equals mass flow. If we divide by $f^2$, we obtain $K \times \text{density}$.

In order to divide the amplitude of the transducer signal by $f$, the output of transducer 19 is applied to an operational amplifier 20 contained in a suitable housing 21 mounted on the Swirlmeter. The operational amplifier is provided with a frequency-responsive network imparting a $1/f$ characteristic to the amplifier. Hence the output of this amplifier is an A-C signal whose amplitude is indicative of mass flow. By adding a second operational amplifier in cascade relation to the first, to again divide by $f$, the amplitude of the output signal of the second amplifier is indicative of the density of the fluid being measured.

In order to obtain accurate mass flow and density, the pressure transducer output as a measurement of kinetic energy must be substantially linear through the dynamic range of the Swirlmeter or whatever vortex-type meter is being used. Thus in the case of a Swirlmeter having a range of about 100 to 1,000 Hz, the transducer linearity throughout this range should be about plus or minus 1 percent.

The operational amplifier must also have an accurate $1/f$ relationship between frequency and gain throughout the dynamic range. In one actual embodiment of an operational amplifier used for mass flow measurement, the relationship between frequency and gain conformed to the $1/f$ relationship throughout a 100 to 1,000 Hz range.

While there have been shown and described preferred embodiments of vortex-type mass flowmeters in accordance with the invention, it will be appreciated that many changes and modifications may be made therein without, however, departing from the essential spirit of the invention.

I claim:

1. Apparatus for measuring the mass flow of a fluid, said apparatus comprising:

A. a vortex meter having a flow tube in which a fluid to be measured is caused by obstacle means in the flow path to produce a pulsatory fluidic vortex at a frequency which is a function of flow rate, and a pressure-responsive sensor for detecting said fluidic pulses to produce an electrical signal at the same frequency, the amplitude of said signal being a function of the kinetic energy contained in said vortex, and B. an operational amplifier coupled to said sensor and directly responsive to said electrical signal whose frequency is a function of the fluid flow rate and whose amplitude is a function of said kinetic energy, said amplifier having a gain which is inversely proportional to frequency to divide the sensor signal by frequency to produce an output signal whose amplitude is indicative of mass flow.

2. Apparatus as set forth in claim 1, wherein said obstacle means is constituted by swirl blades.

3. Apparatus as set forth in claim 1, wherein said obstacle means is constituted by a bluff body.

4. Apparatus as set forth in claim 1, wherein said sensor is constituted by a piezo-electric crystal transducer.

5. Apparatus as set forth in claim 1, further including means to divide said output signal by frequency to produce an indication of fluid density.

6. Apparatus as set forth in claim 1, further including means to integrate said output signal to totalize said mass flow.

* * * * *